United States Patent
Kast et al.

(10) Patent No.: US 9,096,113 B2
(45) Date of Patent: Aug. 4, 2015

(54) GASKET STRING, IN PARTICULAR FOR SEALING A DOOR JAMB AGAINST A VEHICLE DOOR

(75) Inventors: Christian Kast, Merzig-Brotdorf (DE); Martin Dillmann, Nalbach (DE)

(73) Assignee: CQLT Saargummi Technologies S.à.r.l., Remich (LU)

( * ) Notice: Subject to any disclaimer, the term of this patent is extended or adjusted under 35 U.S.C. 154(b) by 0 days.

(21) Appl. No.: 14/235,203

(22) PCT Filed: Jul. 26, 2012

(86) PCT No.: PCT/DE2012/100226
§ 371 (c)(1),
(2), (4) Date: Jan. 27, 2014

(87) PCT Pub. No.: WO2013/013672
PCT Pub. Date: Jan. 31, 2013

(65) Prior Publication Data
US 2014/0173993 A1    Jun. 26, 2014

(30) Foreign Application Priority Data

Jul. 28, 2011 (DE) .......................... 10 2011 052 232

(51) Int. Cl.
*E06B 7/22* (2006.01)
*B60J 10/00* (2006.01)

(52) U.S. Cl.
CPC .................................. *B60J 10/0034* (2013.01)

(58) Field of Classification Search
CPC .................................................... B60J 10/0034
USPC ............. 49/475.1, 498.1, 492.1, 493.1, 477.1
See application file for complete search history.

(56) References Cited

U.S. PATENT DOCUMENTS

| | | | | |
|---|---|---|---|---|
| 2,969,252 A | * | 1/1961 | Gruver | 277/642 |
| 3,927,493 A | | 12/1975 | Tsuneishi et al. | |
| 4,702,039 A | * | 10/1987 | Bocchinfuso | 49/490.1 |
| 4,952,442 A | * | 8/1990 | Warner | 428/83 |
| 5,122,406 A | * | 6/1992 | Sakamaki et al. | 428/122 |
| 5,361,542 A | * | 11/1994 | Dettloff | 49/477.1 |
| 5,423,147 A | * | 6/1995 | Dupuy | 49/490.1 |

(Continued)

FOREIGN PATENT DOCUMENTS

DE  199 24 809 C2  11/2000
DE  201 17 679 U1   4/2002

(Continued)

OTHER PUBLICATIONS

International Search Report of PCTDE2012/100226, mailed Nov. 7, 2012.

(Continued)

*Primary Examiner* — Jerry Redman
(74) *Attorney, Agent, or Firm* — Collard & Roe, P.C.

(57) ABSTRACT

A gasket string, in particular for sealing a door jamb against a vehicle door, has a fixing portion, preferably comprising a first elastomeric material, which together with a further portion, which optionally comprises a second elastomeric material softer than the first elastomeric material, forms a tubular seal, the tube wall of which has openings arranged at intervals in the longitudinal direction of the string. The openings are arranged such that in the installed position the openings are concealed by a circumferentially formed angled portion of the tube wall of the gasket string.

12 Claims, 3 Drawing Sheets

(56) References Cited

U.S. PATENT DOCUMENTS

| | | | |
|---|---|---|---|
| 5,469,667 A * | 11/1995 | Le Marrec | 49/477.1 |
| 5,622,008 A * | 4/1997 | King | 49/498.1 |
| 5,626,383 A * | 5/1997 | Lee et al. | 296/146.9 |
| 5,918,421 A * | 7/1999 | Nozaki | 49/492.1 |
| 6,485,597 B1 | 11/2002 | Warnecke et al. | |
| 6,623,014 B1 | 9/2003 | Martin | |
| 6,922,945 B2 * | 8/2005 | Dron | 49/477.1 |
| 7,735,263 B2 * | 6/2010 | Oba et al. | 49/490.1 |
| 8,765,041 B2 * | 7/2014 | Minoura et al. | 264/250 |
| 2004/0145213 A1 | 7/2004 | Watanabe | |
| 2008/0246304 A1 | 10/2008 | Huttebraucker et al. | |

FOREIGN PATENT DOCUMENTS

| | | |
|---|---|---|
| DE | 699 05 674 T2 | 12/2003 |
| DE | 20 2005 004 006 U1 | 4/2006 |
| DE | 10 2005 018 906 B4 | 10/2006 |
| DE | 10 2006 032 349 A1 | 1/2008 |
| EP | 0 201 223 A1 | 11/1986 |
| EP | 1 093 421 B1 | 4/2001 |
| FR | 2 519 399 A1 | 7/1983 |
| GB | 2 266 742 A | 11/1993 |
| GB | 2 342 113 A | 5/2000 |

OTHER PUBLICATIONS

German Search Report in 10 2011 052 232.8, dated Jul. 9, 2012, with English translation of relevant parts.

* cited by examiner

GASKET STRING, IN PARTICULAR FOR SEALING A DOOR JAMB AGAINST A VEHICLE DOOR

CROSS REFERENCE TO RELATED APPLICATIONS

This application is the National Stage of PCT/DE2012/100226 filed on Jul. 26, 2012, which claims priority under 35 U.S.C. §119 of German Application No. 10 2011 052 232.8 filed on Jul. 28, 2011, the disclosure of which is incorporated by reference. The international application under PCT article 21(2) was not published in English.

BACKGROUND OF THE INVENTION

1. Field of the Invention

The invention relates to a gasket string, particularly for sealing a door jamb against a vehicle door, having an attachment portion that forms a gasket tube with a further portion, the tube wall of which tube has openings disposed spaced apart from one another in the longitudinal string direction.

2. The Prior Art

Such a gasket string, shown in FIG. 1, is known from use. The openings in the gasket tube of this known gasket string as mentioned above, which serve for ventilation and, if necessary, for water dissipation, are produced by means of mechanical working or laser drilling of a tube wall portion formed by softer elastomer material. Production of the openings by means of mechanical working requires great effort, above all if the openings are supposed to be produced during continuous production of the gasket string, in such a precise manner that they do not impair the appearance of the gasket string. If, furthermore, it is supposed to be ensured that no particles, which can occur during a drilling process, collect in the cavity of the gasket cross-section, the effort is increased once again.

If the aforementioned laser drilling method is used for production of the ventilation openings, then it is advantageously prevented, to a great extent, that particles settle in the cavity. However, residues that occur during the laser drilling process often greatly contaminate the profile surface, in disadvantageous manner.

SUMMARY OF THE INVENTION

The invention is based on the task of creating a new gasket string of the type mentioned initially, the openings of which can be produced with little effort, with an optically appealing surface, and during the production process of which neither the aforementioned drilling residues nor contamination of the profile surface occur.

The gasket string according to the invention, which accomplishes this task, is characterized in that the openings are disposed so that in the installed position, they are covered by an angled portion of the tube wall of the gasket tube, which is formed in the circumferential direction.

It is advantageous if the angled portion offers visual protection to cover the openings that are formed, in the installed position, which protection makes it possible to produce the openings with less precision than according to the state of the art.

In a preferred embodiment, the openings are disposed behind a step of the tube wall, which step surrounds the angled portion particularly at the foot of the step.

It is advantageous that the openings can be disposed in an indentation of the tube wall of the gasket tube that has two steps and angled portions, whereby preferably, the open side of the indentation is provided for placement against a car body portion of the door jamb. Covering the indentation with the car body portion offers additional visual protection.

Preferably, the gasket string is provided for being affixed to the door jamb for the vehicle door, so that it has an additional edge protection function. Vice versa, it could also be connected with the vehicle door.

In one embodiment of the invention, the attachment portion consists of a first elastomer material, and the further portion consists of a second elastomer material that is softer as compared with the first elastomer material.

Preferably, the openings are provided in a portion of the gasket string formed by the first elastomer material. It is advantageous if this firmer elastomer material allows production of the openings by means of material displacement or removal, as described in DE 10 2005 018 960 B4 of the applicant. No particles can collect in the tube interior. The gasket string produced in this manner is therefore particularly suitable for the production of gasket profiles that have an above-average length, which are usually wound up onto a roll and processed by means of roll application.

In a further preferred embodiment, the openings are disposed at a boundary region between the first and second elastomer material, in the boundary region formed by the first elastomer material.

It is practical if the tube wall thickness in the circumferential portion of the gasket tube that has the openings is reduced as compared with the adjacent portions. This facilitates production of the openings, particularly according to the method mentioned above, by means of material displacement or removal.

In one embodiment of the invention, the attachment portion has an attachment shank to be connected with a car body flange, which shank forms a portion of the tube wall of the gasket tube.

Preferably, the openings are formed in an angled end portion of the attachment shank, at its end away from the free end of the car body flange.

BRIEF DESCRIPTION OF THE DRAWINGS

The invention will be explained further in the following, using an exemplary embodiment and the attached drawings, which relate to this exemplary embodiment. These show.

DETAILED DESCRIPTION OF THE PREFERRED EMBODIMENTS

Figure 1:
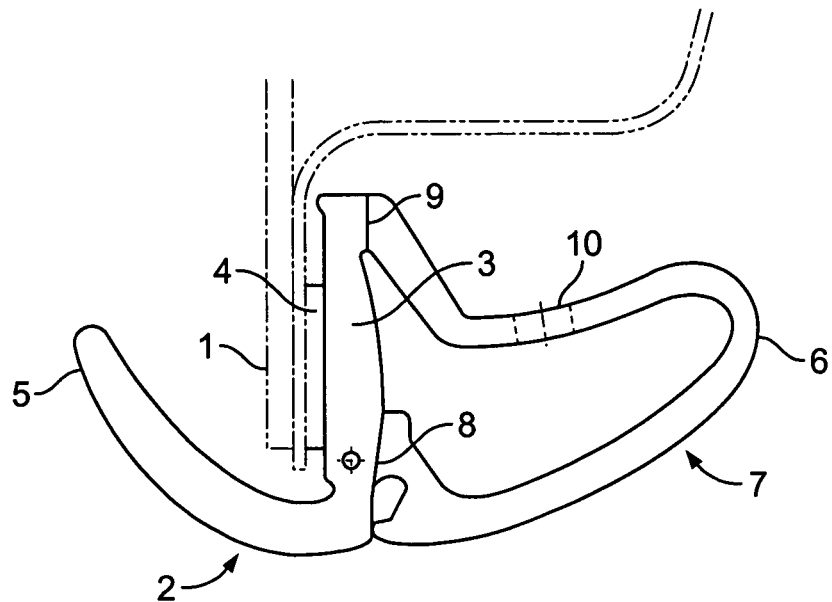
FIG. 1 a gasket string according to the state of the art, for sealing a door jamb against a vehicle door, in cross-section, FIG. 2 a gasket string according to the invention, for sealing a door jamb against a vehicle door, in cross-section, FIG. 3 a detail view of the gasket string of FIG. 2, and FIGS. 4 to 6 further exemplary embodiments of a gasket string according to the invention.
Figure 2:
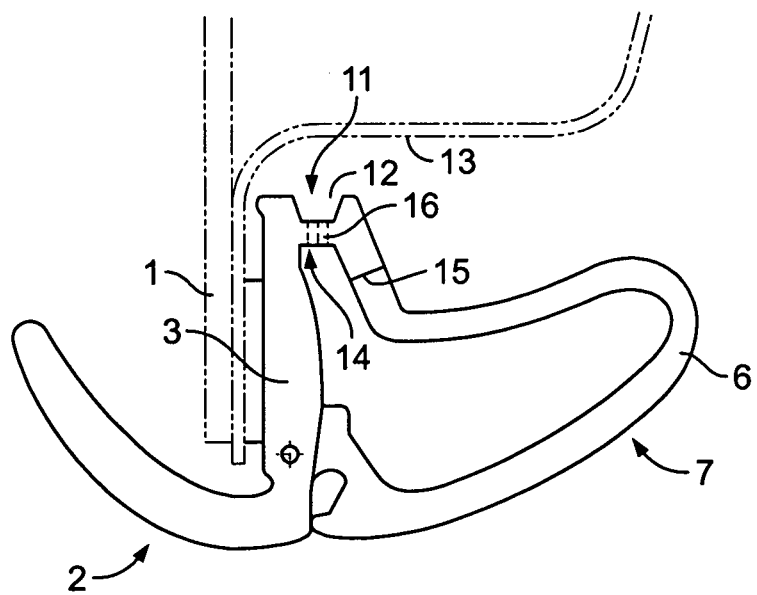
Figure 3:
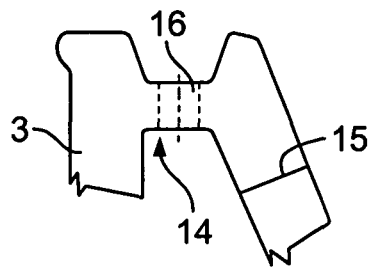

Referring to FIGS. 1 and 2, a gasket string intended to be glued onto a car body flange 1 has an attachment portion 2 that consists of a first elastomer material, e.g. of EPDM. The attachment portion 2 comprises an attachment shank 3, on which a double-sided adhesive strip 4 for the connection with the car body flange 1 is affixed. A lip 5 that engages over the end face surface of the car body flange 1 extends from one end of the attachment shank 3; this lip can decoratively overlap the edge of a vehicle interior trim. In deviation from the example shown, the gasket string could also have a U-shaped attachment portion for being set onto the car body flange.

The attachment shank 3, together with a further section 6, which consists of a second elastomer material that is softer as compared with the first elastomer material, e.g. foam rubber, forms a gasket tube 7. Boundary surfaces between the different elastomer materials, which surfaces pass through the tube wall, are designated with 8 and 9. At 10, the tube wall has openings for ventilation, and, if necessary, water dissipation, which openings are disposed at a distance from one another in the longitudinal string direction.

Introduction of the ventilation openings into the softer second elastomer material, continuously, by means of mechanical working of the gasket string, during co-extrusion of the different elastomer materials, requires great effort, which is furthermore connected with the disadvantages mentioned initially.

A gasket string shown in FIG. 2 differs from the gasket string according to FIG. 1 in that an angled end portion 11 follows the attachment shank 3 of the attachment portion 2, which angled portion, like the attachment shank 3, consists of the first, harder elastomer material, up to a boundary surface 15, and, like the attachment shank 3, forms a further circumferential portion of the gasket tube 7.

The angled end portion 11 has an indentation 12, the open side of which lies opposite a car body portion 13 that leads away from the car body flange 1. By means of the indentation 12, not only steps in the tube wall but also a tube wall portion 14 that is reduced in thickness is/are formed, in which portion openings 16 are introduced, which are disposed at a distance from one another in the longitudinal string direction, like the openings 10 that serve for ventilation and, if necessary, water dissipation.

The openings 16 lie at the foot of the two circumferential steps of the tube wall formed by the indentation 12, and thereby in a region into which it is difficult to look. Furthermore, the view into the indentation is blocked by an opposite car body portion 13 on a door jamb for a vehicle door. The relatively slight wall thickness of the circumferential portion 11 facilitates introduction of the openings 16, which are formed by means of material displacement in the exemplary embodiment shown.

Figure 4:
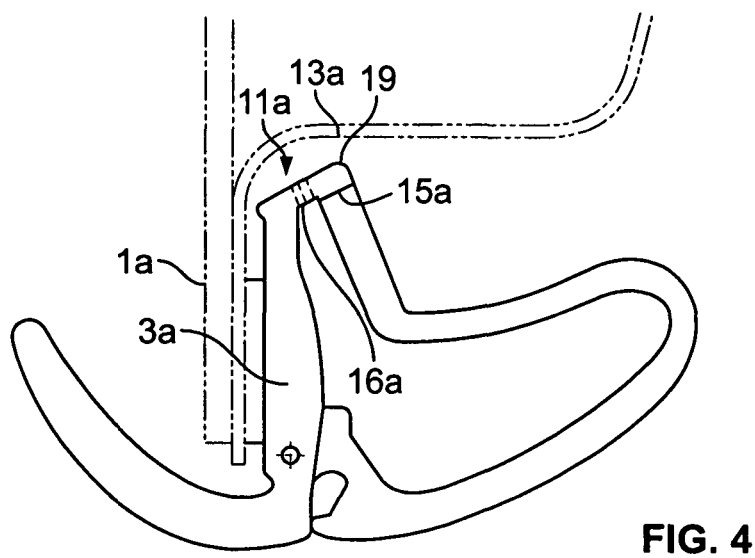

In an exemplary embodiment of a gasket string shown in FIG. 4, an attachment shank 3a makes a transition into an angled end portion 11a, which consists of the same harder elastomer material as the attachment shank 3a up to a boundary surface 15a, and in which openings 16a are formed at a distance from one another in the longitudinal string direction. In contrast to the angled end region 11 of the preceding exemplary embodiment, the angled end region 11a does not have an indentation. An angled region 19 formed in the tube wall in the circumference direction ensures that the region of the openings 16a is predominantly covered from view.

Figure 5:
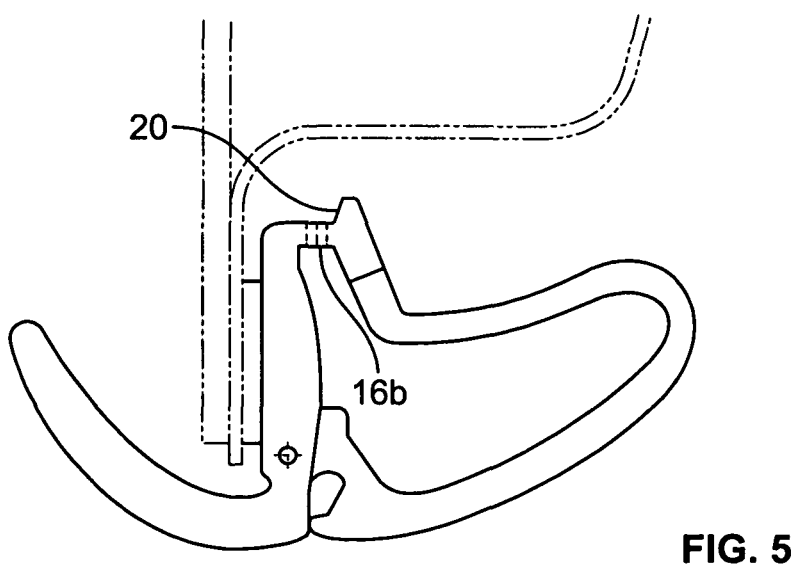

The region of openings 16b in an exemplary embodiment shown in FIG. 5 is also covered from view, to a great extent. The openings 16b lie at the foot of a step 20.

Figure 6:
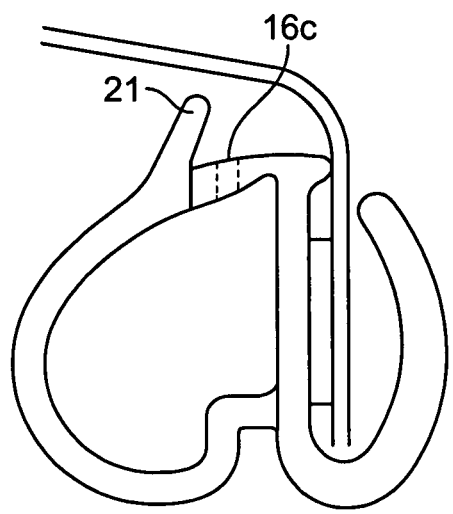

In an exemplary embodiment shown in FIG. 6, a lip 21 that projects from the tube wall forms a step that covers a region of openings 16c formed at the foot of the step.

The invention claimed is:

1. Gasket string, having an attachment portion that forms a gasket tube with a further section, a gasket tube wall of which gasket tube has openings disposed spaced apart from one another in a longitudinal string direction,
   wherein the openings are disposed so that in position, all of the openings are covered by an angled portion of the gasket tube wall of the gasket tube, which is formed in a circumferential direction,
   wherein the openings are disposed in an indentation in a circumference surface of the gasket tube or near a lip that projects from the circumference surface;
   wherein the gasket string is provided for being affixed to a door jamb;
   wherein an open side of the indentation is provided for placement against a car body portion of the door jamb;
   wherein the attachment portion comprises a first elastomer material; and
   wherein the further section comprises a second elastomer material that is softer as compared with the first elastomer material.

2. Gasket string according to claim 1, wherein the openings are disposed on a step of the gasket tube wall formed by an angled portion.

3. Gasket string according to claim 2, wherein the angled portion is at a foot of the step.

4. Gasket string according to claim 1, wherein the openings are formed in a circumferential portion of the gasket tube formed by a first elastomer material.

5. Gasket string according to claim 1, wherein the openings are formed at a boundary surface between the first elastomer material and the second elastomer material.

6. Gasket string according to claim 1, wherein a gasket tube wall thickness in a circumferential portion of the gasket tube that has the openings is reduced as compared with circumferential portions adjacent to the circumferential portion.

7. Gasket string according to claim 1, wherein the attachment portion has an attachment shank to be connected with a car body flange, which shank forms a circumferential portion of the gasket tube wall of the gasket tube.

8. Gasket string according to claim 7, wherein the openings are formed in an angled end portion of the attachment shank, at an end away from a free end of the car body flange.

9. Gasket string according to claim 1, wherein the openings are formed via displacement or removal of string material on or from the gasket string when directly exiting from an extrusion die.

10. Gasket string according to claim 1, wherein the gasket string is formed as a gasket profile that has a length, intended for processing via roll application.

11. Gasket string according to claim 10, wherein the gasket string is intended for being wound up onto a roll.

12. Gasket string according to claim 1, wherein the gasket string is provided for sealing a door jamb against a vehicle door.

* * * * *